(12) United States Patent
Maruo et al.

(10) Patent No.: US 12,319,176 B2
(45) Date of Patent: Jun. 3, 2025

(54) VEHICLE SEAT

(71) Applicant: DENSO CORPORATION, Kariya (JP)

(72) Inventors: Kazuki Maruo, Kariya (JP); Isamu Adachi, Kariya (JP); Tomoki Yamashita, Kariya (JP)

(73) Assignee: DENSO CORPORATION, Kariya (JP)

( * ) Notice: Subject to any disclaimer, the term of this patent is extended or adjusted under 35 U.S.C. 154(b) by 46 days.

(21) Appl. No.: 17/990,926

(22) Filed: Nov. 21, 2022

(65) Prior Publication Data

US 2023/0078759 A1    Mar. 16, 2023

Related U.S. Application Data

(63) Continuation of application No. PCT/JP2021/009009, filed on Mar. 8, 2021.

(30) Foreign Application Priority Data

May 22, 2020    (JP) ................................ 2020-089770

(51) Int. Cl.
*B60N 2/06* (2006.01)
*B60N 2/02* (2006.01)
*B60N 2/16* (2006.01)

(52) U.S. Cl.
CPC ......... *B60N 2/165* (2013.01); *B60N 2/02246* (2023.08); *B60N 2/02253* (2023.08)

(58) Field of Classification Search
CPC . B60N 2/02253; B60N 2/02246; B60N 2/165
USPC .................................................. 297/344.17
See application file for complete search history.

(56) References Cited

U.S. PATENT DOCUMENTS

| | | | |
|---|---|---|---|
| 6,712,430 B2* | 3/2004 | Ito ..................... | B60N 2/02246 297/362 |
| 7,775,594 B2* | 8/2010 | Bruck .................... | B60N 2/20 297/378.12 |
| 8,388,067 B2* | 3/2013 | Hida .................. | B60N 2/2213 297/362.11 |
| 8,590,971 B2* | 11/2013 | Ito ...................... | B60N 2/1615 297/344.17 X |

(Continued)

FOREIGN PATENT DOCUMENTS

| | | |
|---|---|---|
| DE | 102007037712 A1 | 8/2008 |
| JP | 2010-960 A | 1/2010 |

(Continued)

*Primary Examiner* — Rodney B White
(74) *Attorney, Agent, or Firm* — Oliff PLC

(57) ABSTRACT

The vehicle seat includes: a seat cushion; a seat back; a lifter link mechanism wherein the seat cushion is displaced by a sector gear being displaced; and a speed reducer-equipped motor including a pinion gear engaging with the sector gear; and a first and second restriction portions that stop the rotation of the pinion gear to one side. The sector gear is displaced to one side by the pinion gear being rotated to one side. The displacement of the sector gear to one side is stopped by the rotation of the pinion gear to one side being stopped by the first and second restriction portions. The sector gear is displaced to the other side by the pinion gear being rotated to the other side. The rotation of the pinion gear to the other side is stopped by the displacement of the sector gear to the other side being restricted.

4 Claims, 12 Drawing Sheets

(56) References Cited

U.S. PATENT DOCUMENTS

| | | | |
|---|---|---|---|
| 8,800,947 B2 * | 8/2014 | Suzuki | B60N 2/161 |
| | | | 297/344.15 X |
| 10,279,712 B2 * | 5/2019 | Bruck | B60N 2/02246 |
| 11,815,161 B2 * | 11/2023 | Sakai | F16H 1/32 |
| 2011/0241400 A1 | 10/2011 | Ito et al. | |
| 2018/0099583 A1 * | 4/2018 | Yagi | B60N 2/1635 |
| 2019/0356196 A1 * | 11/2019 | Izuchi | H02K 7/116 |

FOREIGN PATENT DOCUMENTS

| | | |
|---|---|---|
| JP | 2011-17369 A | 1/2011 |
| JP | 2015-150915 A | 8/2015 |
| JP | 2020-16331 A | 1/2020 |
| WO | 2020/013131 A1 | 1/2020 |

\* cited by examiner

VEHICLE SEAT

CROSS-REFERENCE TO RELATED APPLICATION

The present application is a continuation application of International Application No. PCT/JP2021/009009, filed on Mar. 8, 2021, which claims priority to Japanese Patent Application No. 2020-089770 filed on May 22, 2020. The contents of these applications are incorporated herein by reference in their entirety.

BACKGROUND

Technical Field

The present disclosure relates to a vehicle seat.

Background Art

A speed reducer-equipped motor used for moving a seat cushion of a vehicle seat in the up and down directions of the seat is disclosed. The speed reducer-equipped motor is provided with a pinion gear that engages with a mechanism that moves the seat cushion in the up and down directions of the seat. Moreover, the speed reducer-equipped motor is provided with a mechanism that restricts the rotation range of the pinion gear to a predetermined range.

SUMMARY

In the present disclosure, provided is a vehicle seat as the following.

The vehicle seat includes: a seat cushion; a seat back; a displacement mechanism wherein the seat cushion is displaced by a driven gear being displaced; and a motor including an output gear engaging with the driven gear; and a stopping portion that stops the rotation of the output gear to one side. The driven gear is displaced to one side by the output gear being rotated to one side. The displacement of the driven gear to one side is stopped by the rotation of the output gear to one side being stopped by the stopping portion. The driven gear is displaced to the other side by the output gear being rotated to the other side. The rotation of the output gear to the other side is stopped by the displacement of the driven gear to the other side being restricted.

BRIEF DESCRIPTION OF THE DRAWINGS

The above purpose and other purposes, features and advantages of the present disclosure will be further clarified by the following detailed description while referring to the attached drawings. The drawings are as follows.

FIG. 8 is a diagram showing comparisons between the rotation range of the sector gear and the rotation range of the pinion gear and the like.

FIG. 11 is a diagram showing comparisons between the rotation range of the sector gear and the rotation range of the pinion gear and the like.

FIG. 13 is a diagram showing comparisons between the rotation range of the sector gear and the rotation range of the pinion gear and the like.

DETAILED DESCRIPTION OF THE PREFERRED EMBODIMENTS

[PTL 1] JP2020-016331

In the above Patent Literature 1 (PTL 1), when the rotation range of the pinion gear of the above speed reducer-equipped motor and the movement range of the seat cushion in the up and down directions of the seat are set to correspond to each other, it is possible to restrict the movement range of the seat cushion in the up and down directions of the seat in a predetermined range from the side of the motor with a reducer. However, in such a configuration, the movement range of a seat cushion in the up and down directions of a seat can vary from one seat cushion to another, and it is necessary to set the rotation range of a pinion gear for each vehicle seat, which makes it difficult to standardize the speed reducer-equipped motor.

In consideration of the above fact, the present disclosure intends to obtain a vehicle seat capable of standardizing a motor that displaces a seat cushion and a seat back.

A vehicle seat of a first aspect of the present disclosure includes: a seat cushion that supports the buttocks of a seated occupant, a seat back that supports the back of the seated occupant, and a displacement mechanism including a driven gear supported so as to be displaceable to one side and the other side, wherein the seat cushion or the seat back is displaced to one side and the other side by the driven gear being displaced to one side and the other side; and a motor including an output gear that rotates by being operated and that engages with the driven gear, and a stopping portion that stops the rotation of the output gear to one side, wherein the driven gear is displaced to one side by the output gear being rotated to one side, the displacement of the driven gear to one side stops by the rotation of the output gear to one side being stopped by the stopping portion, the driven gear is displaced to the other side by the output gear being rotated to the other side, and the rotation of output gear to the other side is stopped by the displacement of the driven gear to the other side being restricted.

By configuring the aspect in this manner, it is possible to standardize the motor that displaces the seat cushion and the seat back.

The vehicle seat 50 according to the embodiment will be described with reference to FIGS. 1 to 8. Incidentally, the arrows FR and UP shown in the figures indicate the front side of the seat (the front side in the front-rear direction of the seat) and the upper side of the seat (the upper side in the up and down directions of the seat), respectively, as seen by the occupant seated on the vehicle seat 50. Further, the right side of the seat and the left side of the seat in the following description indicate the right side of the seat and the left side of the seat, respectively, as seen by the occupant seated on the vehicle seat 50. In the following description, each of the above directions may be referred to simply as a front-back, up-down, or left-right direction.

Figure 1:
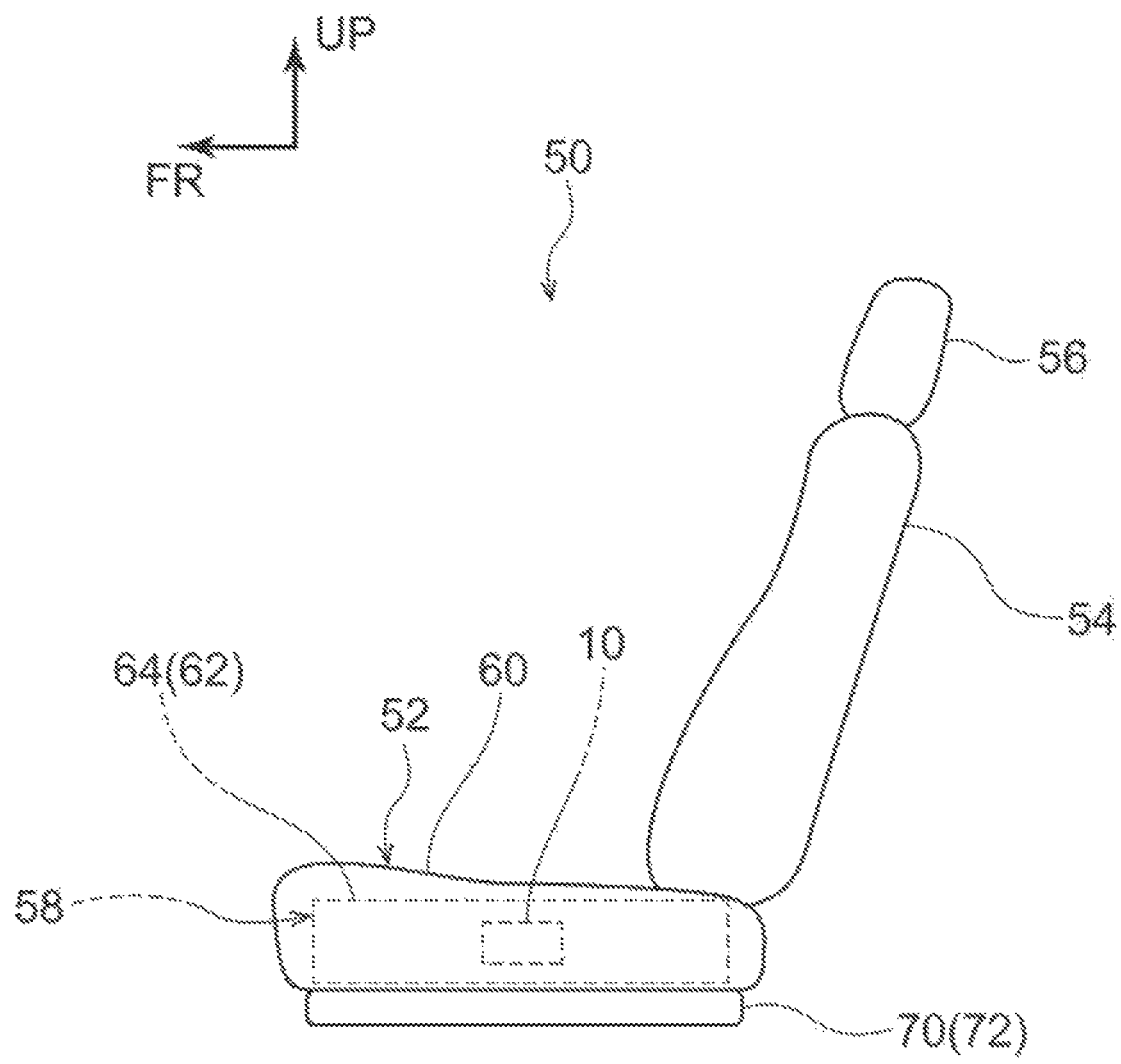
FIG. 1 is a side view showing the vehicle seat of the present embodiment.

As shown in FIG. 1, the vehicle seat 50 is provided with the seat cushion 52 that supports the buttocks of a seated occupant, a seat back 54 that supports the back of the seated occupant and that is attached to the rear end portion of the seat cushion 52, and a headrest 56 that supports the head of the seated occupant and is attached to the upper end portion of the seat back 54. Further, the vehicle seat 50 is provided with the lifter link mechanism 58 that enables the seat cushion 52 to move in the up and down directions of the seat, and the speed reducer-equipped motor 10 as a motor that runs the lifter link mechanism 58.

The seat cushion 52 is configured with a seat cushion pad 60 covered with a covering material and attached to a seat cushion frame 62.

Figure 2:
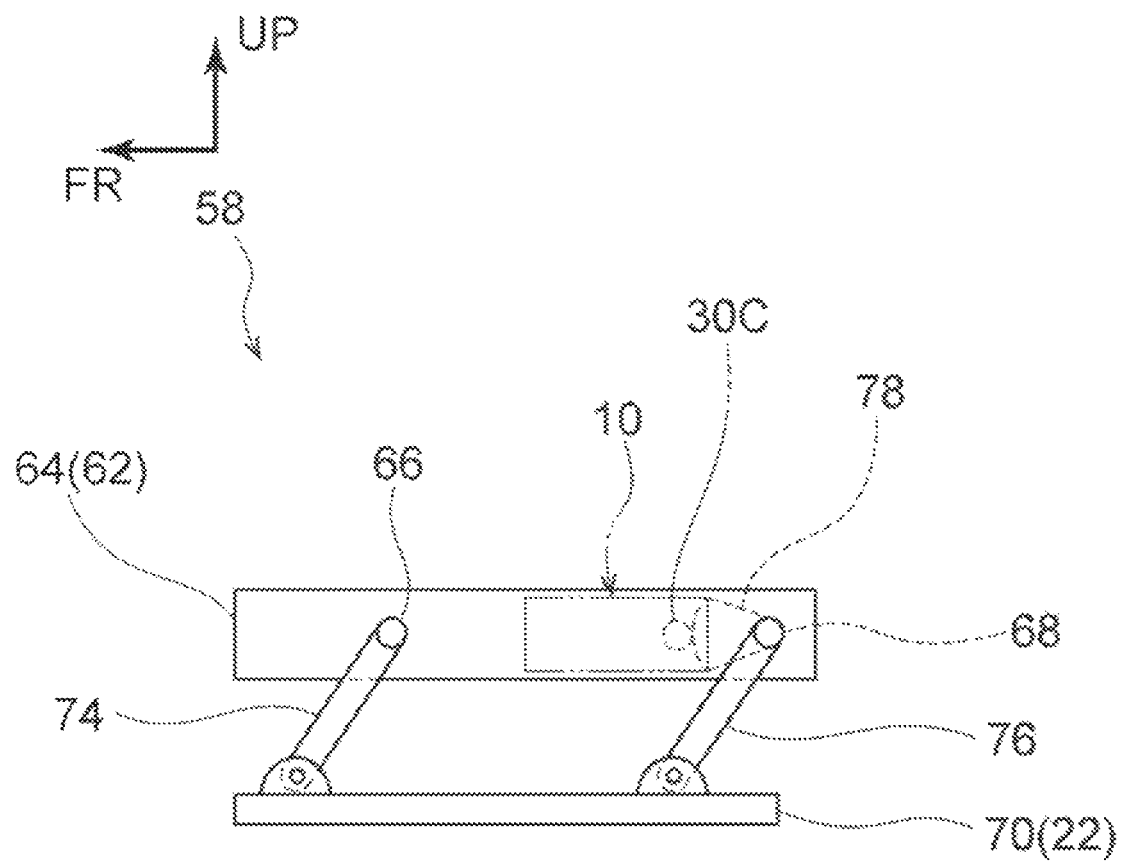
FIG. 2 is a side view showing the lifter link mechanism.

As shown in FIG. 2, the lifter link mechanism 58 is provided with a pair of right and left side frames 64 that are spaced apart in the seat width direction and that extend in the front and back directions, a front shaft 66 that connects the front side portions of the pair of the right and left side frames 64 in the right and left directions and a rear shaft 68 that connects the rear side portions of the pair of the right and left side frames 64 in the right and left directions. The pair of the right and left side frames 64, front shaft 66, and rear shaft 68 constitute a portion of the seat cushion frame 62. Further, the right and left end portions of the front shaft 66 and the rear shaft 68 can rotate with the right and left directions as the rotation axial direction in a state of being inserted into the pair of the right and left side frames 64

The lifter link mechanism 58 is provided with a pair of right and left upper rails 70 arranged in the lower side of the pair of the right and left side frames 64. This pair of the right and left upper rails 70, together with lower rails not shown in the figure, constitute seat slide rails 72. Further, the pair of the right and left upper rails 70 slide along the lower rails fixed to the floor of the vehicle body, so that the seat cushion 52 moves in the forward and rear directions.

The lifter link mechanism 58 is provided with a pair of right and left front connecting portions 74, whose end portions on one side are joined to the right and left end portions of the front shaft 66 by welding and the like, and whose end portions on the other side are rotatably connected to the front end portions of the pair of the right and left upper rails 70 with the left and right directions as the axial direction. Further, the lifter link mechanism 58 is provided with a pair of right and left rear connecting portions 76, whose end portions on one side are joined to the right and left end portions of the rear shaft 68 by welding and the like, and whose end portions on the other side are rotatably connected to the rear end portions of the pair of the right and left upper rails 70 with the left and right directions as the axial direction.

The lifter link mechanism 58 is provided with the sector gear 78 as a driven gear joined to the rear shaft 68 by welding and the like. This sector gear 78 is arranged on the right side with respect to the left side frame 64, and it is arranged close to the left side frame 64 in the left and right directions. Incidentally, details of the constitution of the sector gear 78 will be described in detail later. Further, the sector gear 78 engages with the pinion gear 30C of the speed reducer-equipped motor 10 fixed to the left side frame 64.

Next, the applicant shall describe the speed reducer-equipped motor 10 using FIG. 3 to FIG. 6. Incidentally, the arrow Z direction, arrow R direction, and arrow C direction appropriately shown in the figures shall indicate one side in the rotation axial direction, the outside in the rotation radial direction, and one side in the rotation circumference direction, respectively, of the pinion gear 30C which is an output gear. Further, the side opposite to the arrow Z direction, the side opposite to the arrow R direction, and the side opposite to the arrow C direction shall indicate the other side in the rotation axial direction, the inside in the rotation radial direction, and the other side in the rotation circumference direction, respectively, of the pinion gear 30C which is an output gear. Furthermore, when simply the axial direction, radial direction, and circumference direction are indicated, the rotation axial direction, rotation radial direction, and rotation circumference direction of the pinion gear 30C shall be presumed to be indicated, unless otherwise noted.

Figure 3:
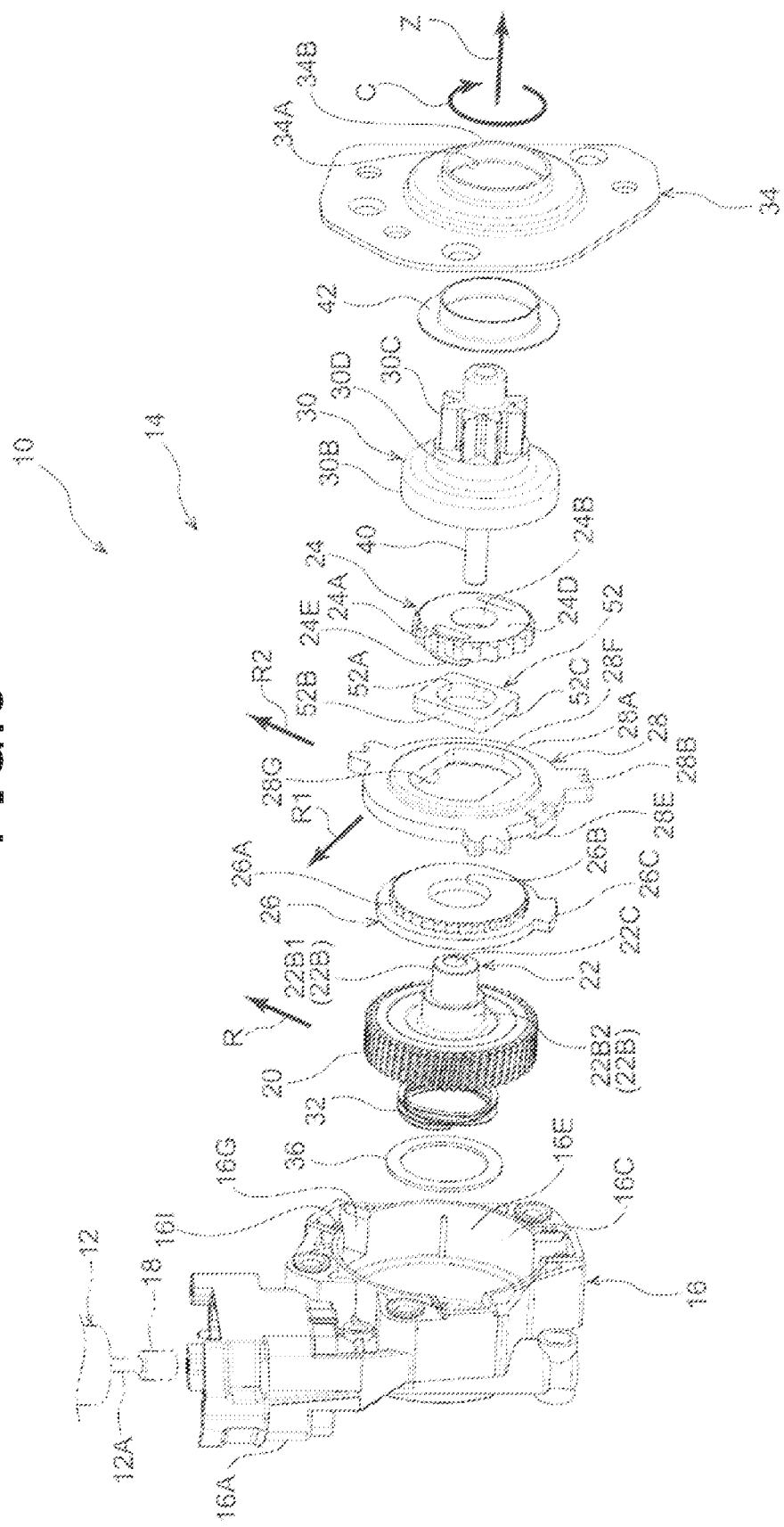
FIG. 3 is an exploded perspective view of the speed reducer-equipped motor.
Figure 4:
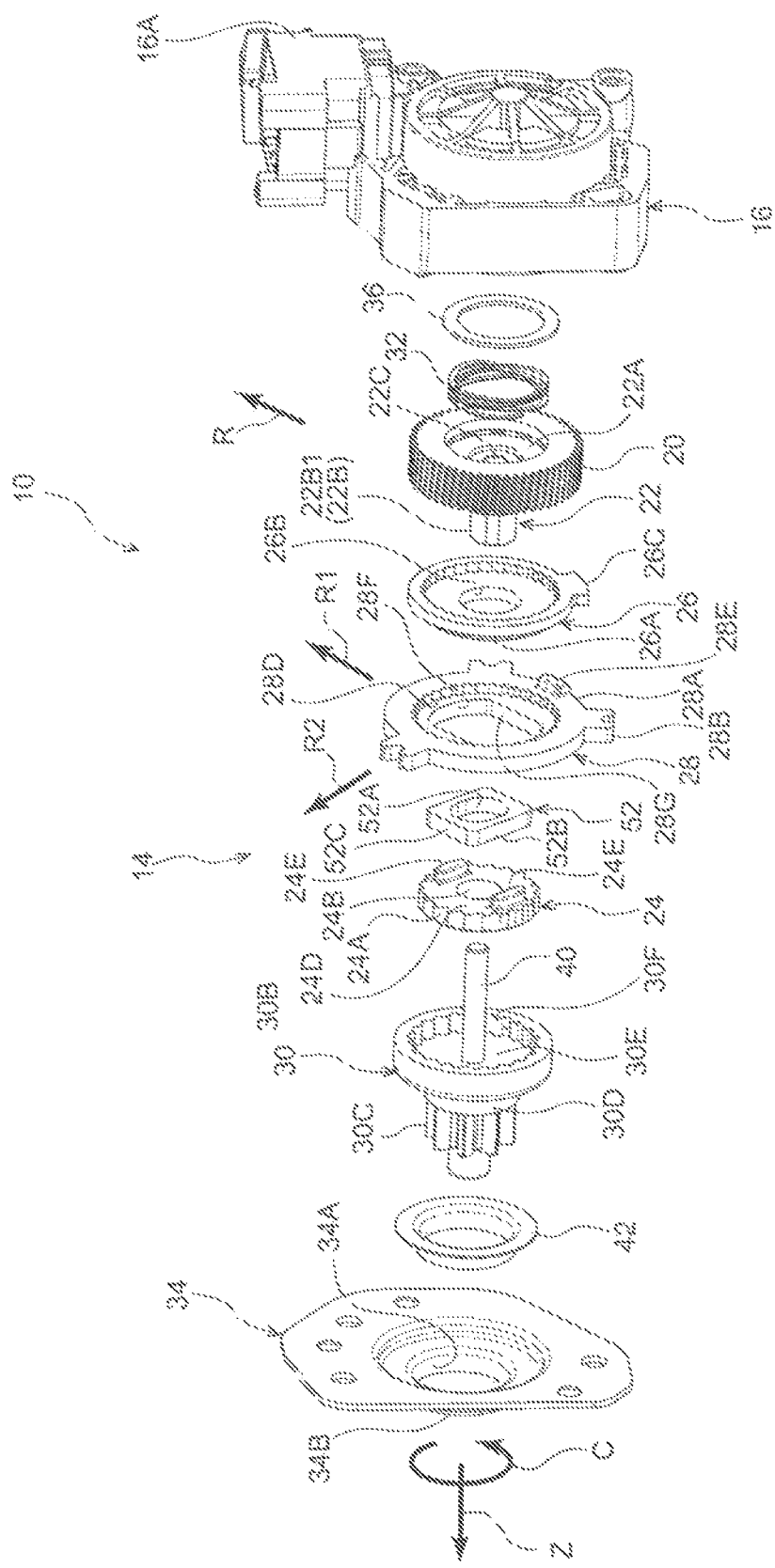
FIG. 4 is an exploded perspective view of the speed reducer-equipped motor, and shows a view seen from the opposite side of the motor seen in FIG. 3.
Figure 5:
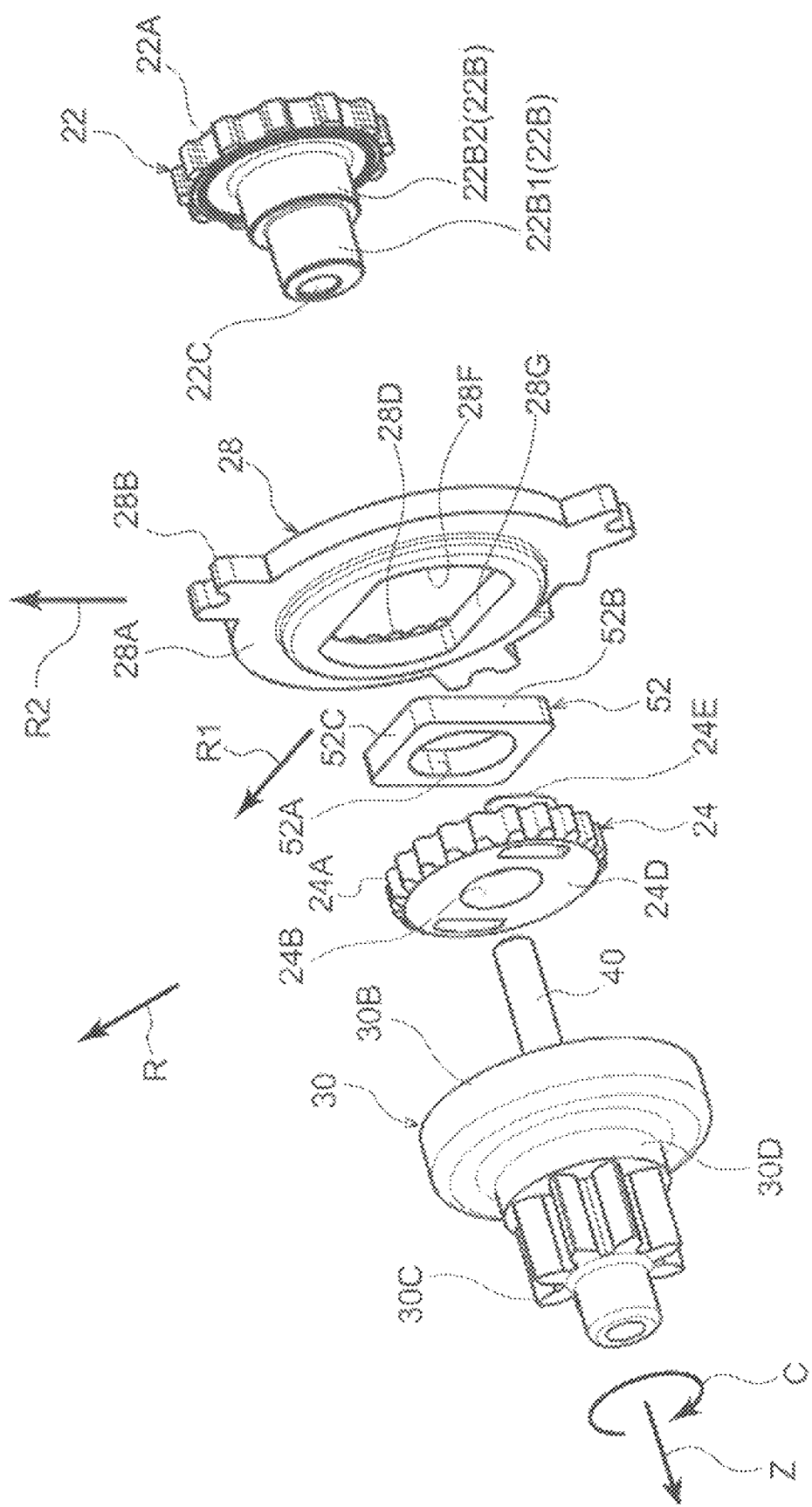
FIG. 5 is an exploded perspective view showing an eccentric shaft, a fixed gear, a transmission gear, and an output gear body constituting a portion of the speed reducer.

As shown in FIG. 3, FIG. 4, and FIG. 5, the speed reducer-equipped motor 10 is a motor for a power seat for moving the seat cushion of the vehicle seat in the up and down directions of the seat. This speed reducer-equipped motor 10 is provided with a motor 12 which is a direct current motor. Further, the speed reducer-equipped motor 10 is provided with a speed reducer 14 for transmitting rotation of the rotation shaft 12A of the motor 12 at a reduced speed to the output gear body 30 as an output part. Furthermore, the speed reducer-equipped motor 10 is installed with the motor 12, and it is provided with a housing 16 in which the speed reducer 14 is installed.

The speed reducer 14 is provided with a worm gear 18 fixed to the rotation shaft 12A of the motor 12, a helical gear 20 as a first gear to engage with the worm gear 18, and an eccentric shaft 22 provided integrally with the helical gear 20.

Further, the speed reducer 14 is provided with a transmission gear 24 and a lock gear 26 supported on the eccentric shaft 22, and a fixed gear 28 which engages with the lock gear 26. Furthermore, the speed reducer 14 is provided with a slider plate 52 that is supported on the fixed gear 28, and as a rotation limiting member, that limit the rotation of the transmission gear 24 by being engaged with the transmission gear 24. Further, the speed reducer 14 is provided with the output gear body 30 which engages with the transmission gear 24 and which has the pinion gear 30C, and whose axial direction faces the same direction as the axial direction of the helical gear 20, the transmission gear 24 and the lock gear 26 (that is, the arrow Z direction and the opposite direction of the arrow Z direction) and which is arranged on the same axis as that of the helical gear 20.

Further, the speed reducer-equipped motor 10 is provided with a spring 32 to suppress backlash of the eccentric shaft 22, the helical gear 20 and the like in the axial direction. Further, the speed reducer-equipped motor 10 is provided with a cover plate 34 that is fixed to the housing 16 so that the speed reducer 14 is housed in the housing 16.

As shown in FIG. 3 and FIG. 4, housing 16 is formed by using a resin material. This housing 16 is provided with a motor fixing portion 16A where the rotation shaft 12A of the motor 12 is fixed in a state facing the direction perpendicular to the axial direction (arrow Z direction). Further, the housing 16 is provided with a speed reducer accommodating concave portion 16C in which the speed reducer 14 is accommodated. This speed reducer accommodating concave portion 16C is formed in a concave-shape in which one side in the axial direction (arrow Z direction side) is opened.

As shown in FIG. 3, the speed reducer accommodating concave portion 16C is configured to include a bottom wall portion that forms the bottom of the speed reducer accommodating concave portion 16C, and a sidewall portion 16E that extends from the periphery portion of the bottom wall portion to one side in the axial direction and whose inner circumferential surface is formed in a roughly cylindrical surface-shape. In the center portion of the bottom wall portion of the speed reducer accommodating concave portion 16C, a cylindrical boss portion is protruded in which the end portion of the other side in the axial direction of the rotation central shaft 40, which will be described later, is inserted with a clearance. Further, the spring 32 is arranged around the boss portion in the bottom wall portion. A resin washer 36 is interposed between the bottom wall portion and the spring 32.

In the inner circumference portion of the sidewall portion 16E of the speed reducer accommodating concave portion 16C, three fixed gear engaging portions 16G that regulate the rotation displacement in the circumference direction of the fixed gear 28 are formed by a portion of the fixed gear 28, which will be described later, being fitted. In each of the three fixed gear engaging portions 16G, a columnar pillar portion 16I is provided.

The cover plate 34 is formed by using a steel plate material or the like. In this cover plate 34, an exposure opening 34A is formed for exposing the pinion gear 30C to the outside of the speed reducer accommodating concave portion 16C of the housing 16. Further, at the periphery portion of the exposure opening 34A in the cover plate 34, an annular rib 34B bent toward the other side in the axial direction is formed.

In the periphery portion of the worm gear 18, a spiral teeth portion is formed. When the motor 12, which is in a state where this worm gear 18 is fixed to the rotation shaft 12A, is fixed to the housing 16, thereby, the worm gear 18 is arranged in the bottom wall portion side of the speed reducer accommodating concave portion 16C of the housing 16 and the inner circumferential surface side of the sidewall portion 16E.

As shown in FIG. 3 and FIG. 4, helical gear 20 is formed by using a resin material. In the periphery portion of the helical gear 20, a plurality of external teeth are formed that engage with the teeth of the worm gear 18. Further, in the shaft center portion of the helical gear 20, the eccentric shaft 22, which will be described later, is fixed by insert molding. Further, the helical gear 20 is rotatably supported by the housing 16 via the eccentric shaft 22 and the rotation center shaft 40.

As shown in FIG. 4 and FIG. 5, the eccentric shaft 22 is formed by using a metal material, and concurrently it is rotatable together with the helical gear 20 when a portion of the eccentric shaft 22 is inserted in the helical gear 20. Specifically, the eccentric shaft 22 is provided with a disk portion 22A formed in a disk-shape that extends in the radial direction with the axial direction as the thickness direction. The periphery portion of this disk portion 22A is formed in a concavo-convex shape along the circumference direction. Further, the disk portion 22A is fixed to the inner circumference portion of the helical gear 20 in a state where the axis center of the disk portion 22A is aligned with the rotation center of the helical gear 20.

Further, as shown in FIG. 3 and FIG. 5, the eccentric shaft 22 is provided with a support portion 22B which protrudes from the center portion of the disk portion 22A toward one side in the axial direction. One side in the axial direction of the support portion 22B is a first support portion 22B1 to which the transmission gear 24, which will be described later, is rotatably supported. Further, the other side in the axial direction of the support portion 22B is configured to have a larger diameter than that of the first support portion 22B1, and a second support portion 22B2 rotatably supports the lock gear 26, which will be described later. The axis centers for the first support portion 22B1 and the second support portion 22B2 are offset radially outward in one direction with respect to the axis center of the disk portion 22A.

Figure 6:
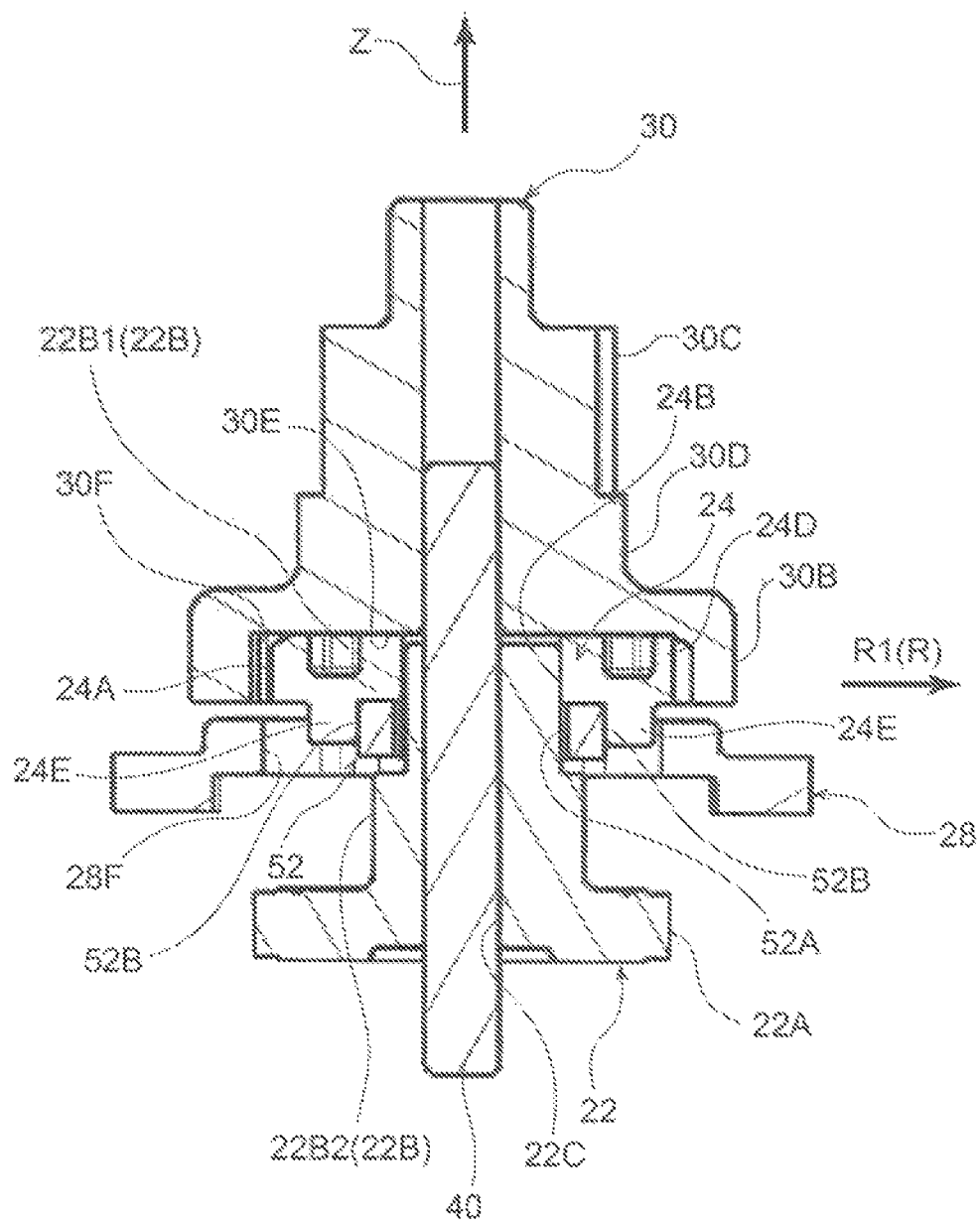
FIG. 6 is a cross-sectional view of the eccentric shaft, the fixed gear, the transmission gear, and the output gear body constituting a portion of the speed reducer along the axial direction of the output shaft.

Further, as shown in FIG. 4, FIG. 5, and FIG. 6, in the eccentric shaft 22 a rotation center shaft insertion hole 22C is formed which penetrates through the disk portion 22A, the first support portion 22B1 and the second support portion 22B2 in the axial direction, and concurrently into which the rotation center shaft 40 is inserted. The shaft center (that is, the shaft center of the rotation center shaft 40 inserted in the rotation center shaft insertion hole 22C) of this rotation center shaft insertion hole 22C coincides with the axis center of the disk portion 22A.

As shown in FIG. 4 and FIG. 6, the output gear body 30 as the output gear is formed by using a metal material. This output gear body 30 is provided with a transmission gear engaging portion 30B that engages with the transmission gear 24. As shown in FIG. 4, in the transmission gear engaging portion 30B, the transmission gear 24 side (the other side in the axial direction) is open, and an accommodating concave portion 30E is formed for arranging inside a transmission gear main body portion 24D of the transmission gear 24. In the inner circumference portion of the outside in the radial direction of this accommodating concave portion 30E, a plurality of internal teeth 30F that engage with the external teeth 24A of the transmission gear 24 are formed.

Further, the output gear body 30 is arranged coaxially with the transmission gear engaging portion 30B on one side in the axial direction with respect to the transmission gear engaging portion 30B, and it is provided with a pinion gear 30C in which a plurality of external teeth are formed in the outer peripheral portion. Further, the intermediate portion between the transmission gear engaging portion 30B and the pinion gear 30C in the output gear body 30 is a shaft-supported portion 30D pivotally supported by the rib 34B formed on the cover plate 34. Incidentally, a bearing bush 42 formed by using a resin material or the like is engaged with the inner peripheral surface of the rib 34B. As a result, contact between metals of the shaft-supported portion 30D of the output gear body 30 and the rib 34B of the cover plate 34 is prevented or suppressed. Further, a rotation center shaft 40 formed in a rod shape using a metal material is fixed to the shaft center portion of the output gear body 30 by press fitting or the like.

As shown in FIG. 3 and FIG. 4, the fixed gear 28 is formed by press processing a metal material or the like. This fixed gear 28 is provided with a fixed gear main body 28A formed in an annular shape in an axial direction view. Further, the fixed gear 28 is provided with three engaging protrusions 28B protruding from the fixed gear main body 28 toward the outside in the radial direction. Further, in a state where the engaging protrusions 28B are engaged with the fixed gear engaging portion 16G of the housing 16, the fixed gear 28 is fixed to the housing 16 by a push nut (not shown in the figures) being engaged with the pillar portion 16I.

Further, in the inner circumference portion of the fixed gear main body portion 28A, a plurality of internal teeth 28D, with which the lock gear 26, to be described later, engages, are formed.

Further, the fixed gear 28 is provided with a second restriction portion 28E as stopping portions that protrude from the fixed gear main body 28A toward the other side in the axial direction. This second restriction portion 28E protrudes from a portion of the fixed gear main body 28A in the circumferential direction to the other side in the axial direction.

Further, in the axis core portion on one side in the axial direction of the portion where the internal teeth 28D are formed in the fixed gear main body 28A of the fixed gear 28, an edge portion is formed in a rectangular shape (rectangular shape) in an axial direction view, and a slider plate engaging hole 28F in which a slider plate 52 is arranged is formed therein. Further, in the edge portion of the slider plate engaging hole 28F, a surface arranged so as to face a pair of a first slider surface 52C of the slider plate 52 in the radial direction, to be described later, is referred to as a second slider surface 28G. Further, the rotation of the slider plate 52 with respect to the fixed gear 28 is restricted by arranging the first slider surface 52C and the second slider surface 28G so as to face each other and close to each other. Further, by having the first slider surface 52C slide on the second slider surface 28G, the slider plate 52 and the transmission gear 24 are allowed to be displaced in one direction R1 in the radial direction. As a result, when the eccentric shaft 22 rotates, the transmission gear 24 revolves around the shaft center of the rotation center shaft 40 in a state where the rotation of the transmission gear 24 supported by the first support portion 22B1 of the eccentric shaft 22 is restricted.

As shown in FIG. 3, FIG. 4, FIG. 5, and FIG. 6, the transmission gear 24 is formed in a roughly circular disk shape by press processing a metal material or the like. This transmission gear 24 is provided with a transmission gear main body portion 24D in which a plurality of external teeth 24A are formed on the periphery portion thereof. A support hole 24B supported by the first support portion 22B1 of the eccentric shaft 22 is formed in the central portion of the transmission gear main body portion 24D. Further, the transmission gear 24 is provided with two restricting protrusions 24E that protrude from the surface of the other side in the axial direction of the transmission gear main body 24D toward the other side in the axial direction. These two restricting protrusions 24E are arranged at equal intervals (at a pitch of 180 degrees) along the circumference direction. Further, by the two restricting protrusions 24E being engaged with the slider plate 52, to be described later, the rotation of the eccentric shaft 22 of the transmission gear 24 around the first support portion 22B1 is restricted.

As shown in FIG. 3 and FIG. 5, the slider plate 52 is formed by using a plate material made of metal, and it is formed in a rectangular shape (rectangular shape) in an axial direction view. This slider plate 52 is arranged between the two restricting protrusions 24E of the transmission gear 24 inside the slider plate engaging hole 28F formed in the fixed gear 28. Further, in the periphery portion of the slider plate 52, the surfaces arranged so as to face each other in the radial direction with the two restricting protrusions 24E are the engaged surfaces 52B. Further, in a state where the slider plate 52 is arranged between the two restricting protrusions 24E of the transmission gear 24, the displacement of the transmission gear 24 with respect to the slider plate 52 in the direction in which the engaged surface 52B and the restricting protrusions 24E face each other (the one direction R1 in the radial direction) is restricted, and the rotation of the transmission gear 24 with respect to the slider plate 52 is restricted. Further, by having the restricting protrusions 24E slide on the engaged surface 52B, the displacement of the transmission gear 24 in the direction in which the engaged surface 52B and the restricting protrusions 24E slide (the other direction R2 in the radial direction orthogonal to the one direction R1 in the radial direction) is allowed. Further, a pair of surfaces arranged opposite to and close to the second slider surface 28G of the slider plate engaging hole 28F in the periphery portion of the slider plate 52 are the first slider surfaces 52C. Incidentally, in the shaft core portion of the slider plate 52, an insertion hole 52A, which is an oblong hole (an oblong hole with the other direction R2 in the radial direction as the longitudinal direction) through which the first support portion 22B1 of the eccentric shaft 22 is inserted, is formed. Further, in the present embodiment, the distance between the pair of engaged surfaces 52B of the slider plate 52 is set to be smaller than the distance between the pair of the first slider surfaces 52C. As a result, the slider plate 52 has a rectangular shape in which the pair of the engaged surfaces 52B constitute the long sides and the pair of the first slider surfaces 52C constitute the short sides when viewed in the axial direction.

As shown in FIG. 3 and FIG. 4, the lock gear 26 is formed in a disk shape by press processing a metal material similarly to the case of forming the transmission gear 24. In the periphery portion of this lock gear 26, the external teeth 26B that engage with the internal teeth 28D of the fixed gear 28 are formed throughout the entire periphery. Further, in the center portion of the lock gear 26, a support hole 26B supported by the second support portion 22B2 of the eccentric shaft 22 is formed. Further, the lock gear 26 is provided with the first restriction portion 26C as a stopping portion which protrudes toward the outside in the radial direction, and is formed in a fan shape when viewed in the axial direction. The first restriction portion 26C is provided in a portion of the lock gear 26 in the circumference direction. Further, in a state where the external teeth 26A of the lock gear 26 engage with the internal teeth 28D of the fixed gear 28, the first restriction portion 26C is arranged along the surface of the other side in the axial direction of the fixed gear main body 28A of the fixed gear 28.

As shown in FIG. 3 and FIG. 4, according to the speed reducer-equipped motor 10 described above, the worm gear 18 rotates when the rotating shaft 12A of the motor 12 rotates. Further, when the worm gear 18 rotates, the helical gear 20 that engages with the worm gear 18 rotates together with the eccentric shaft 22.

Furthermore, when the eccentric shaft 22 rotates, the transmission gear 24 supported by the first support portion 22B1 of the eccentric shaft 22 revolves around the rotation center shaft 40. More specifically, when the eccentric shaft 22 rotates, the restricting protrusions 24E of the transmission gear 24 move in the radial direction (arrow R2 and the opposite direction to arrow R2) while sliding on the engaged surface 52B of the slider plate 52. Further, while the first slider surface 52C of the slider plate 52 slides on the second slider surface 28G of the fixed gear 28, the slider plate 52 and the transmission gear 24 move in the radial direction (arrow R1 and the opposite direction to arrow R1). As a result, the transmission gear 24 revolves around the axis center of the rotation center shaft 40 in a state where the rotation of the transmission gear 24 supported by the first support portion 22B1 of the eccentric shaft 22 is restricted.

As shown in FIG. 3 and FIG. 4, when the transmission gear 24 revolves, the rotational force associated with this revolution is transmitted from the external teeth 24A of the transmission gear 24 to the output gear body 30 via the internal teeth 30F of the output gear body 30. As a result, the output gear body 30 rotates.

Further, when the eccentric shaft 22 rotates, the stopping gear 26 supported by the second support portion 22B2 of the eccentric shaft 22 revolves around the rotation center shaft 40 and rotates while engaged with the fixed gear 28. Further, as shown in FIG. 4 and FIG. 5, when the first restriction portion 26C of the stopping gear 26 comes into contact with the second restriction portion 28E of the fixed gear 28, the revolution and rotation of the stopping gear 26 are constrained. More specifically, when the rotation shaft 12A of the motor main body 12 is rotating to one side, the first restriction portion 26C of the stopping gear 26 comes into contact with the end surface of one side in the circumference direction of the second restriction portion 28E of the fixed gear 28. As a result, the rotation of the pinion gear 30C to one side stops. Incidentally, the position of the pinion gear 30C at this position is referred to as the "motor lower end position M1". On the other hand, when the rotation shaft 12A of the motor main body 12 is rotating to the other side, the first restriction portion 26C of the stopping gear 26 comes into contact with the end surface of the other side in the circumference direction of the second restriction portion 28E of the fixed gear 28. As a result, the rotation of the pinion gear 30C to the other side stops. Incidentally, the position of the pinion gear 30C at this position is referred to as the "motor upper end position M2". Further, the rotation range of the pinion gear 30C, which is restricted to a predetermined range by having the first restriction portion 26C and the second restriction portion 28E, is referred to as the "motor operating range M".

Figure 7:
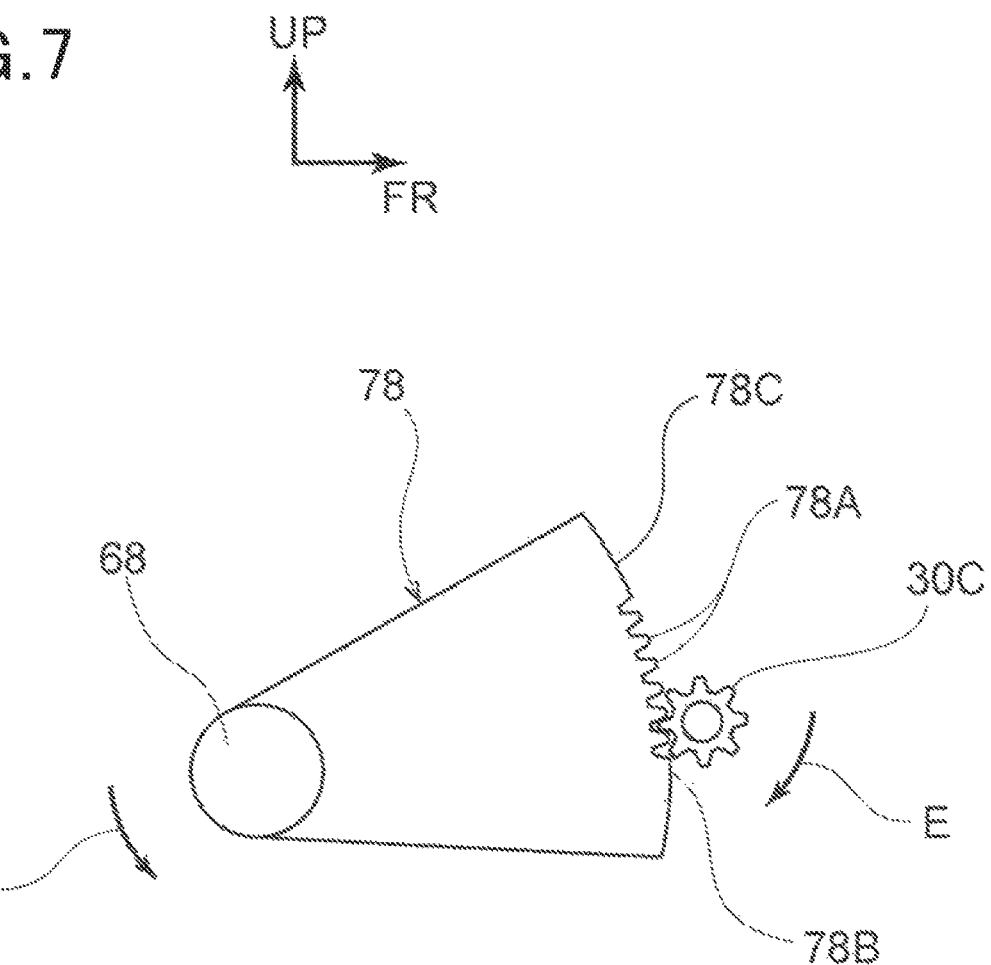
FIG. 7 is a side view showing a sector gear and a pinion gear with a stroke A specification.

As shown in FIG. 7, the sector gear 78 is formed in a plate shape with the left and right directions as the thickness direction, and it is formed in a shape that is roughly a fan-shape when viewed from the side of the seat. The inner circumference portion of the sector gear 78 is joined to the rear shaft 68 by welding or the like. Further, the periphery portion of the sector gear 78 is arranged on the front side with respect to the rear shaft 68. In the periphery portion of the sector gear 78, a plurality of external teeth 78A that engage with the pinion gear 30C of the speed reducer-equipped motor 10 are formed along the rotation circumference direction of the rear shaft 68 (arrow D direction and the opposite direction to the arrow D direction). Here, the relative range of movement of the pinion gear 30C that can engage with the plurality of external teeth 78A formed in the periphery portion of the sector gear 78 with respect to the sector gear 78 will be referred to as a "system operating range S". Incidentally, this system operating range S corresponds to the range between the first unengageable portion 78B and the second unengageable portion 78C, which will be described later.

The lower side of the portion where a plurality of external teeth 78A are formed in the periphery portion of the sector gear 78 is the first unengageable portion 78B as an unengageable portion that is unable to engage with the pinion gear 30C of the speed reducer-equipped motor 10. Incidentally, the position of the pinion gear 30C when the pinion gear 30C comes into contact with the first unengageable portion 78B is referred to as the "system lower end position S1". Further, the upper side of the portion where a plurality of external teeth 78A are formed in the periphery portion of the sector gear 78 is the second unengageable portion 78C as an unengageable portion that is unable to engage with the pinion gear 30C of the speed reducer-equipped motor 10. Incidentally, the position of the pinion gear 30C when the pinion gear 30C comes into contact with the second unengageable portion 78C is referred to as the "system upper end position S2".

Further, as shown in FIG. 1, FIG. 2 and FIG. 7, when the pinion gear 30C of the speed reducer-equipped motor 10 rotates to one side (arrow E direction), the sector gear 78 together with the rear shaft 68 rotate to one side in the rotation circumference direction of the rear shaft 68 (arrow D direction). As a result, the seat cushion 52 descends. In contrast, when the pinion gear 30C of the speed reducer-equipped motor 10 rotates to the other side (opposite to the arrow E direction), the sector gear 78 together with the rear shaft 68 rotate to the other side in the rotation circumference direction of the rear shaft 68 (opposite to the arrow D direction). As a result, the seat cushion 52 ascends. Here, the range of descent and ascent of the seat cushion 52 in the up and down directions is referred to as the "seat operating range H". Further, the position of the seat cushion 52 in the state where the seat cushion 52 is positioned at the lowermost side is referred to as the "seat lower end position H1". Further, the position of the seat cushion 52 in the state where the seat cushion 52 is located on the uppermost side is referred to as "seat upper end position H2".

Figure 8:
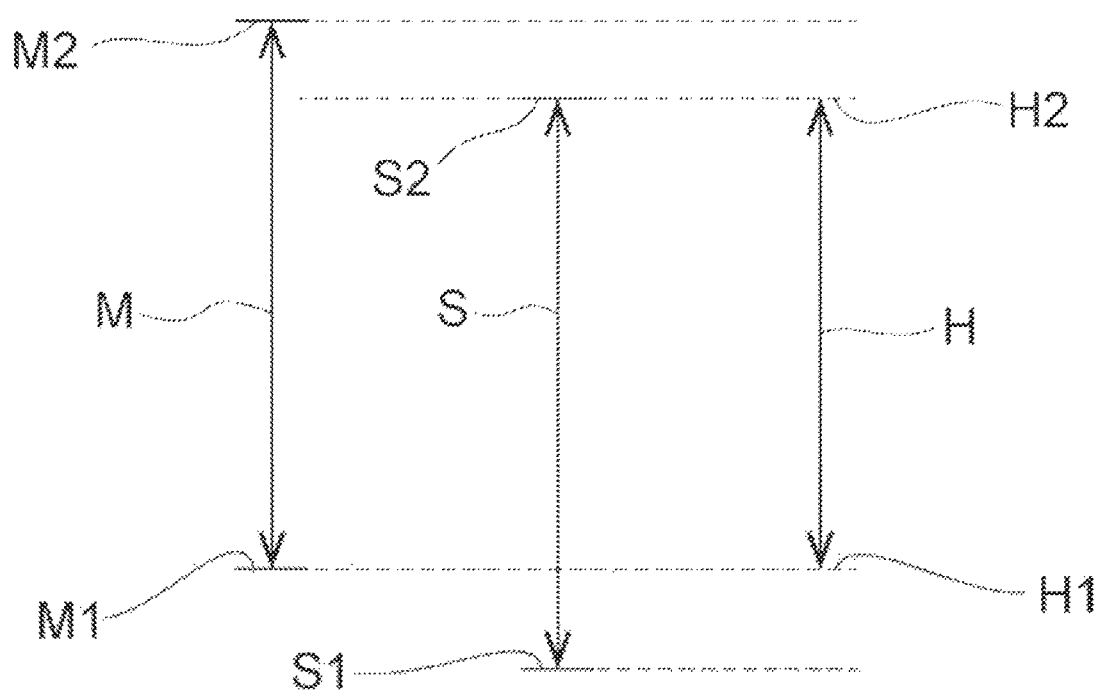

As schematically shown in FIG. 8, in the vehicle seat 50 of the present embodiment, the above-mentioned motor operating range M and the system operating range S are offset so as to fall in a predetermined seat operating range H. Specifically, the motor operating range M and the system operating range S are offset so that the seat lower end position H1 corresponds to the motor lower end position M1, and the seat upper end position H2 corresponds to the system upper end position S2.

(Action and Effect of the Present Embodiment)

Next, the applicant shall describe the action and effect of the present embodiment.

As shown in FIG. 1 to FIG. 4, and FIG. 7 to FIG. 8, in the vehicle seat 50 of the present embodiment described above, when the rotation shaft 12A of the motor main body 12 of the speed reducer-equipped motor 10 rotates to one side, the pinion gear 30C rotates to one side (arrow E direction side), and the sector gear 78 together with the rear shaft 68 rotate to one side in the rotation circumference direction of the rear shaft 68 (arrow D direction side). As a result, the seat cushion 52 descends. Further, when the rotation shaft 12A of the motor main body 12 of the speed reducer-equipped motor 10 is rotating to one side, that is, when the pinion gear 30C is rotating to one side, if the first restriction portion 26C of the stopping gear 26 comes into contact with the end surface of one side in the circumference direction of the second restriction portion 28E of the fixed gear 28, the rotation of the pinion gear 30C to one side stops before the pinion gear 30C *comes* into contact with the first unengageable portion 78B of the sector gear 78. As a result, the rotation of the sector gear 78 to one side stops, and the descent of the seat cushion 52 stops. That is, the seat cushion 52 stops at a position corresponding to the seat lower end position H1.

In contrast, when the rotation shaft 12A of the motor main body 12 of the speed reducer-equipped motor 10 rotates to the other side, the pinion gear 30C rotates to the other side (opposite side of the arrow E direction), and the sector gear 78 together with the rear shaft 68 rotate to the other side in the rotation circumference direction of the rear shaft 68 (opposite side of the arrow D direction). As a result, the seat cushion 52 ascends. Further, when the rotation shaft 12A of the motor main body 12 of the speed reducer-equipped motor 10 is rotating to the other side, that is, when the pinion gear 30C is rotating to the other side, if the pinion gear 30C comes into contact with the second unengageable portion 78C of the sector gear 78, the rotation of the sector gear 78 to the other side stops. As a result, the rotation of the sector gear 78 to the other side stops, and the ascent of the seat cushion 52 stops. That is, the seat cushion 52 stops at a position corresponding to the seat upper end position H2. Further, in a state where the pinion gear 30C is in contact with the second unengageable portion 78C of the sector gear 78, the pinion gear 30C cannot rotate further to the other side, so that the rotation of the pinion gear 30C to the other side stops.

As described above, in the vehicle seat 50 of the present embodiment, when the descent of the seat cushion 52 stops at the seat lower end position H1, it is arranged so that unnecessary force is not exerted from the pinion gear 30C of the speed reducer-equipped motor 10 to the lifter link mechanism 58 side including the sector gear 78. As a result, it is possible to prevent discomfort on the part of the seated occupant from deformation of the lifter link mechanism 58. In particular, in the configuration of the present embodiment, it is possible to suppress deformation of the lifter link mechanism 58 when the seat back 54 is descending, which tends to cause large discomfort associated with deformation of the lifter link mechanism 58.

By the way, in the configuration of the speed reducer-equipped motor 10 constituting a portion of the vehicle seat 50 of the present embodiment, it is possible to have a configuration such that the seat lower end position H1 and the motor lower end position M1 correspond to each other, and the seat upper end position H2 and the motor upper end position M2 correspond to each other. However, with this configuration, it is necessary to set the rotation range of the pinion gear 30C for each of the vehicle seats 50 having different seat operating ranges H from one another. That is, it is necessary to set the shapes, dimensions and the like of the first restriction portion 26C of the stopping gear 26 and the second restriction portion 28E of the fixed gear 28 for each of the vehicle seats 50 having different seat operating ranges H from one another. As a result, it is difficult to standardize the speed reducer-equipped motor 10.

However, in the configuration of the vehicle seat 50 of the present embodiment, the motor operating range M and the system operating range S are offset so that the seat lower end position H1 corresponds to the motor lower end position M1, and the seat upper end position H2 corresponds to the system upper end position S2. In this configuration, it is possible to use speed reducer-equipped motors 10 of the same specification by adjusting the offset amount between the motor operating range M and the system operating range S for each of the vehicle seats 50 having different seat operating ranges H. That is, it is possible to standardize the speed reducer-equipped motors 10 for the vehicle seats 50 having different seat operating ranges H from one another.

Figure 9:
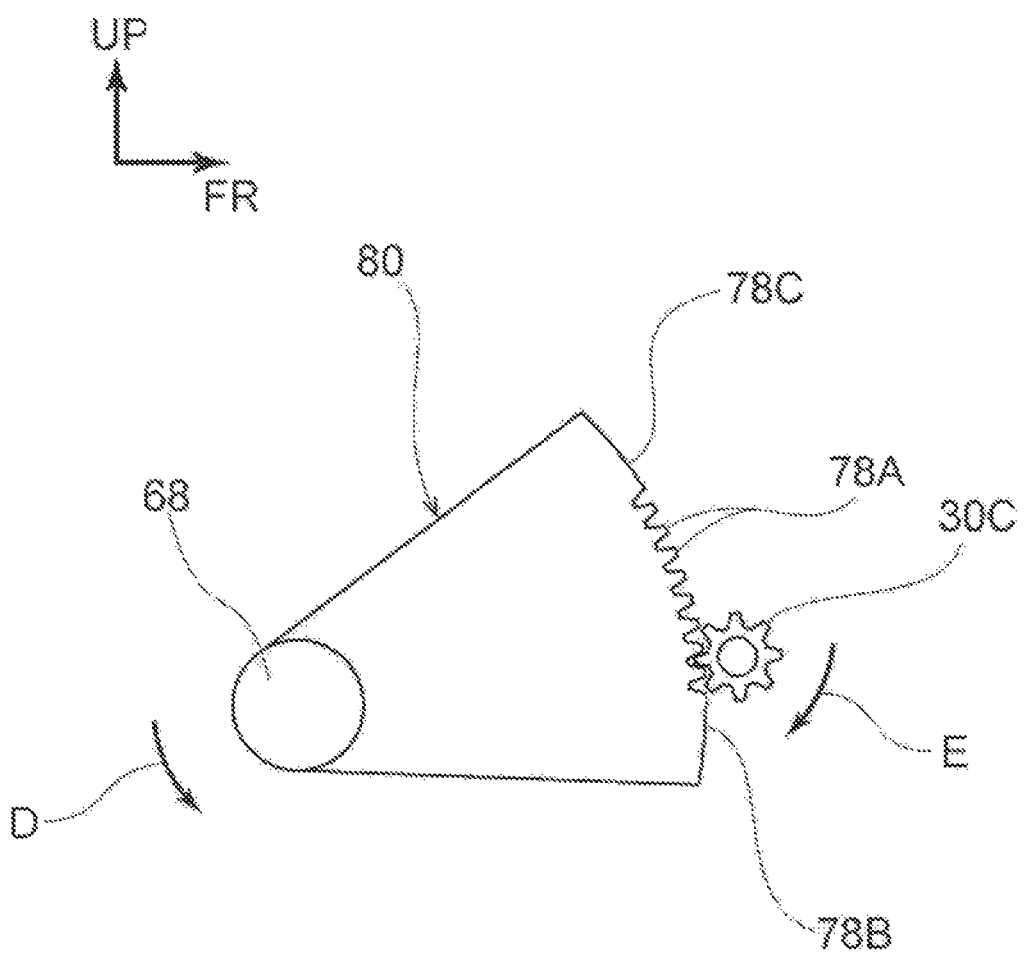
FIG. 9 is a side view showing the sector gear and the pinion gear with a stroke B specification.
Figure 10:
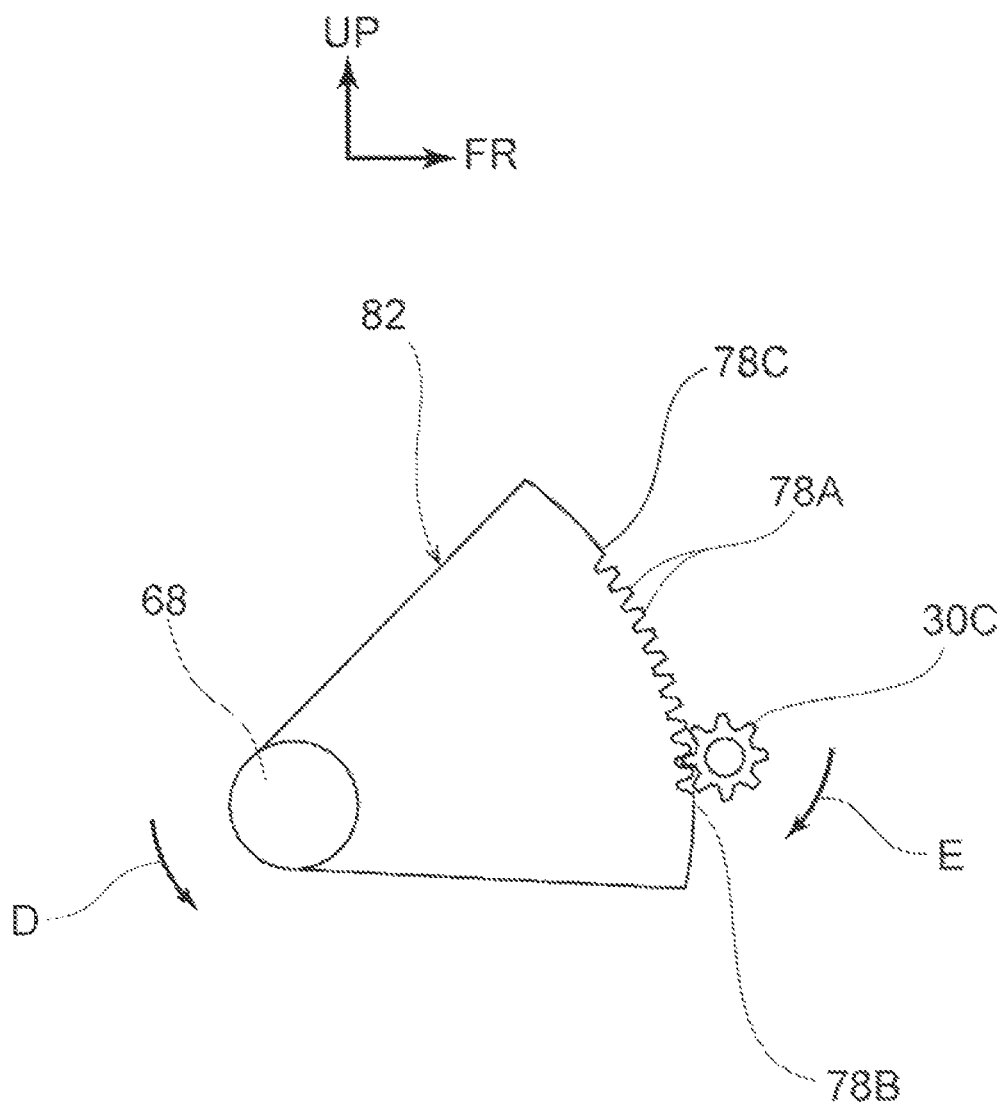
FIG. 10 is a side view showing the sector gear and the pinion gear with a stroke C specification.

Incidentally, in the vehicle seat 50 having a wider seat operating range H than that of the above-described embodiment, sector gears 80 and 82 as driven gears in which the number of external teeth 78A is configured to be larger may be used as shown in FIG. 9 and FIG. 10. Incidentally, in portions of the sector gears 80 and 82 corresponding to those of the above-mentioned sector gear 78, the same signs designated in sector gear 78 are designated.

Here, the sector gear 78 shown in FIG. 5 has a stroke A specification. Further, the sector gear 80 shown in FIG. 9 has a stroke B specification, and the sector gear 82 shown in FIG. 10 has a stroke C specification. Further, as shown in FIG. 11, by offsetting the motor operating range M and the system operating range S by adopting the configuration of each of the sector gears 78, 80, 82, it is possible to adapt to each seat operating range H.

Figure 12:
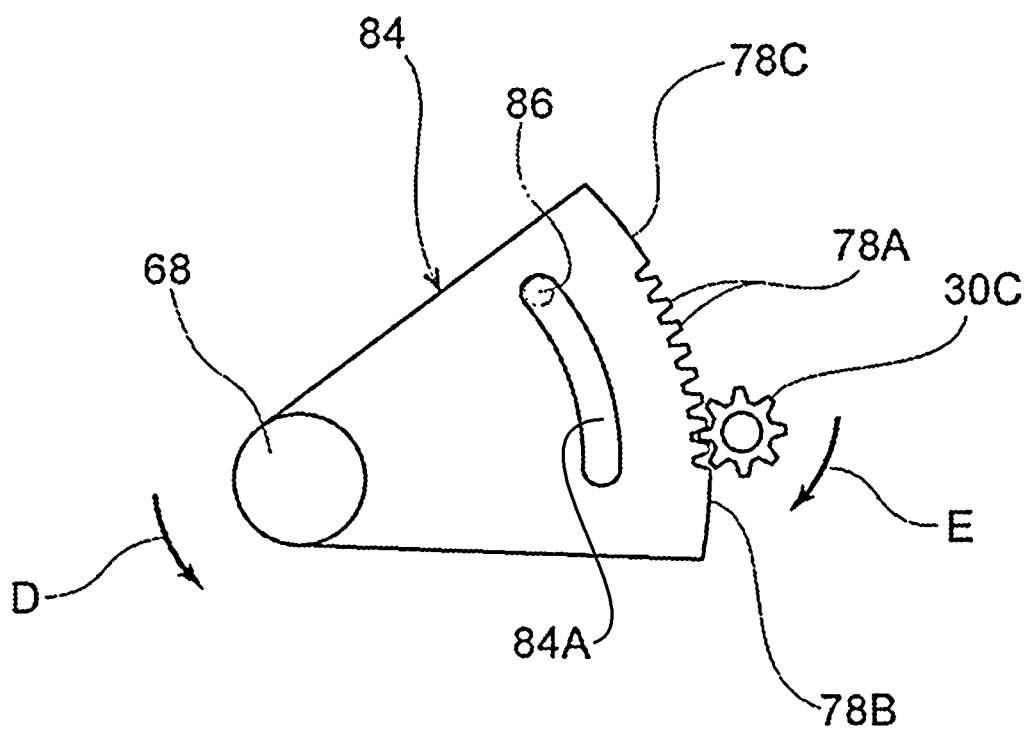
FIG. 12 is a side view showing the sector gear and the pinion gear with another specification.

Incidentally, in the examples using the sector gears 78, 80, 82 with respective specifications, an example where rotation of the pinion gear 30C to the other side stopped by having the pinion gear 30C come into contact with the second unengageable portion 78C of the sector gear 78 was described, but the present disclosure is not limited to this. For example, as shown in FIG. 12, a long groove 84A as a regulating groove is formed in a sector gear 84 as a driven gear, and a regulating pin 86 is inserted into this long groove 84A. Further, when the sector gear 84 together with the rear shaft 68 rotate to the other side in the rotation circumference direction of the rear shaft 68 (the side opposite to the arrow D direction), a configuration may be adopted where, by the edge of the long groove 84A coming into contact with the regulating pin 86, the rotation of the pinion gear 30C to the other side stops.

Figure 11:
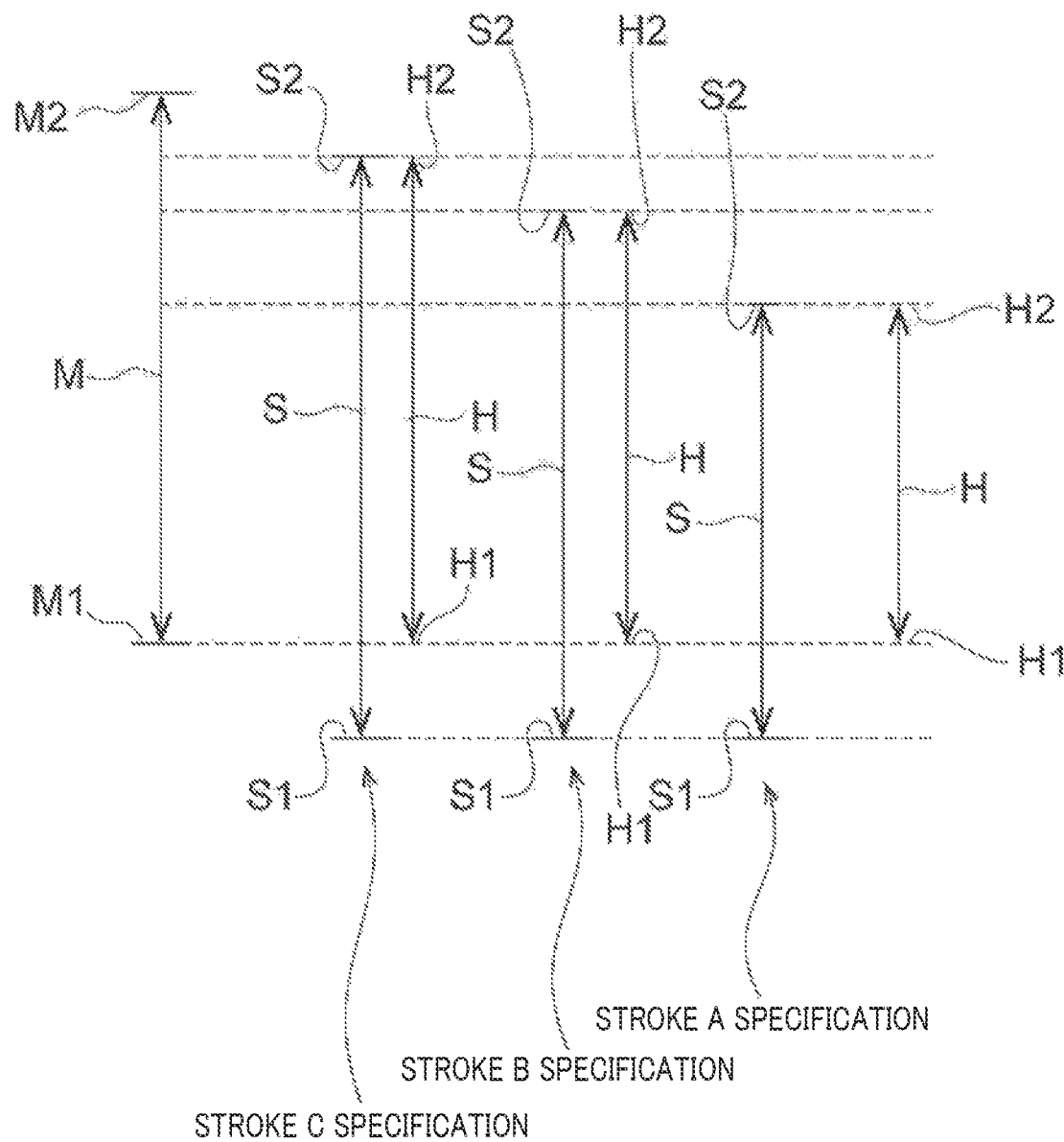
Figure 13:
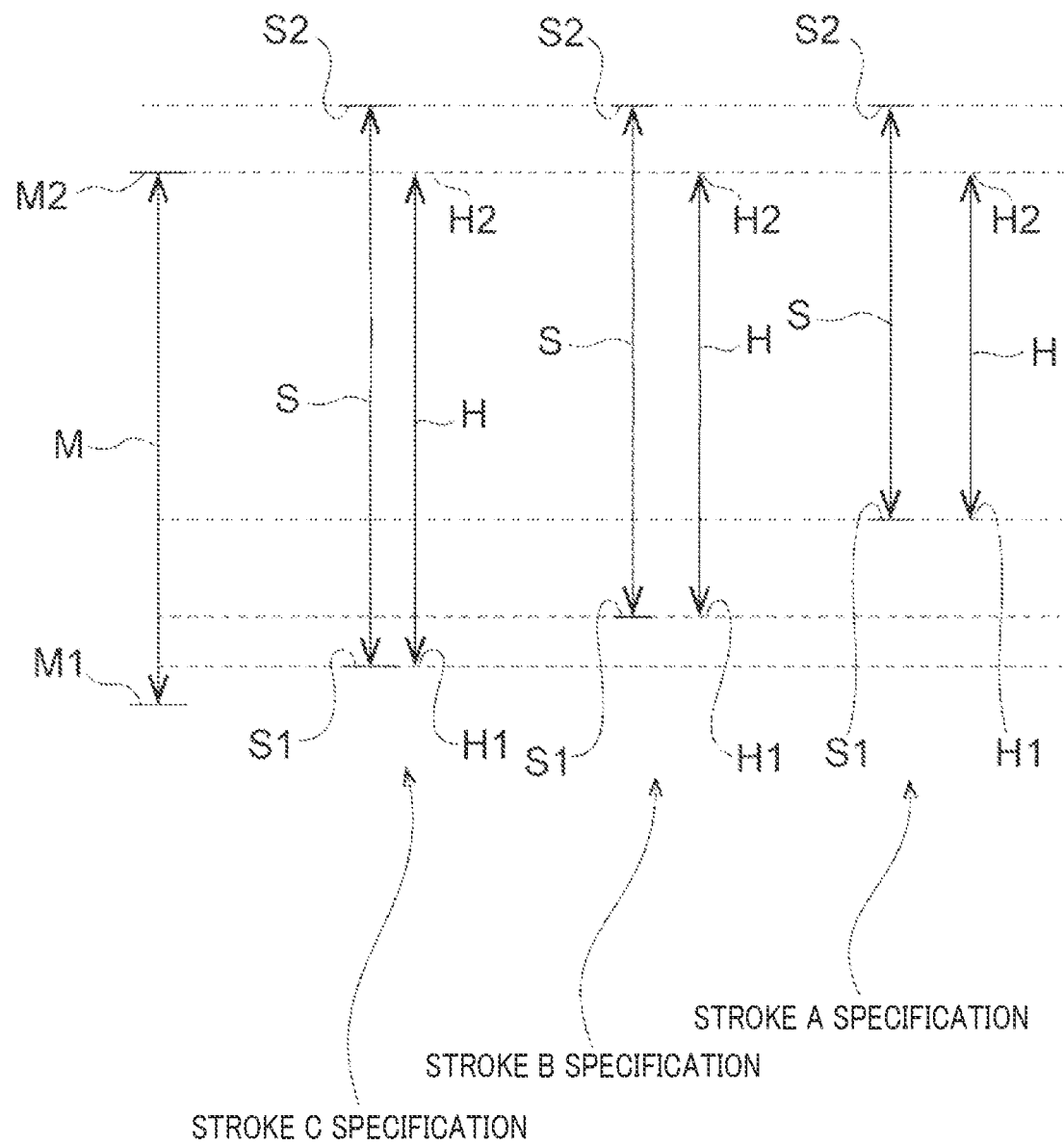

Further, as shown in FIG. 13, the motor operating range M and the system operating range S may offset so that the setting is the opposite to that shown in FIG. 11.

Further, the configuration for standardizing the speed reducer-equipped motor 10 described above can be applied to standardize a motor to operate a mechanism to recline the seat back 54 with respect to the seat cushion 52, and/or to standardize a motor to operate a mechanism to slide the seat cushion 52 in the front and rear directions of the seat.

As such, the applicant has described one embodiment of the present disclosure, but the present disclosure is not limited to the above, and as a matter of course it can be implemented by modifying it in various manners other than the above within the scope not departing from the main purport thereof.

Further, although the applicant described the present disclosure in accordance with the embodiment, it is understood that the present disclosure is not limited to the embodiment or structure. The present disclosure also includes various transformed examples and transformations within an equal scope. In addition, various combinations and configurations, and further, other combinations and configurations including only one element, more than or less than that, fall within the scope and scope of idea of the present disclosure.

What is claimed is:

1. A vehicle seat comprising:
a seat cushion that supports the buttocks of a seated occupant;
a seat back that supports the back of the seated occupant;
a displacement mechanism including a driven gear supported so as to be displaceable in a first direction and a second direction,
wherein the seat cushion or the seat back is displaced in a third direction and a fourth direction by the driven gear being displaced in the first direction and the second direction; and
a motor including an output gear that engages with the driven gear, and a stopping portion that stops the rotation of the output gear in a fifth direction, wherein
the stopping portion is located on a stopping gear and a fixed gear,
the driven gear is displaced in the first direction by the output gear being rotated in the fifth direction, the displacement of the driven gear in the first direction stops due to the rotation of the output gear in the fifth direction being stopped by the stopping portion, the driven gear is displaced in the second direction by the output gear being rotated in a sixth direction, and the rotation of the output gear in the sixth direction is stopped by the displacement of the driven gear in the second direction being restricted, the displacement mechanism is a lifter link mechanism that displaces the seat cushion in up and down directions of the vehicle seat, the seat cushion is displaced to the down direction of the vehicle seat by the driven gear being displaced to the first direction, the seat cushion is displaced to the up direction of the seat by the driven gear being displaced to the second direction, and the rotation of the output gear in the fifth direction being stopped by the stopping portion causes no load to be output from the output gear to the lifter link mechanism.

2. The vehicle seat according to claim 1, wherein the driven gear comprises an unengageable portion that is incapable of engaging with the output gear, and the displacement of the driven gear in the second direction stops by the output gear being rotated in the sixth direction and coming into contact with the unengageable portion.

3. The vehicle seat according to claim 1, wherein a regulating groove, into which a regulating pin is inserted, is formed in the driven gear, and the displacement of the driven gear in the first direction stops by an edge of the regulating groove coming into contact with the regulating pin in response to the driven gear being displaced in the first direction.

4. The vehicle seat according to claim 1, wherein the stopping portion restricts a rotation range of the output gear by stopping the rotation of the output gear in the fifth direction, and the rotation of the output gear in the sixth direction is stopped by the displacement of the driven gear in the second direction being restricted before the rotation of the output gear in the fifth direction is stopped by the stopping portion.

\* \* \* \* \*